(12) United States Patent
Kuchibhotla et al.

(10) Patent No.: US 7,684,407 B2
(45) Date of Patent: Mar. 23, 2010

(54) STATUS REPORT METHOD IN A WIRELESS COMMUNICATION SYSTEM

(75) Inventors: Ravi Kuchibhotla, Gurnee, IL (US); Satyanarayana B Rao, Austin, TX (US); Yishen Sun, Libertyville, IL (US)

(73) Assignee: Motorola, Inc., Schaumburg, IL (US)

(*) Notice: Subject to any disclaimer, the term of this patent is extended or adjusted under 35 U.S.C. 154(b) by 277 days.

(21) Appl. No.: 11/865,717

(22) Filed: Oct. 1, 2007

(65) Prior Publication Data

US 2009/0086646 A1    Apr. 2, 2009

(51) Int. Cl.
*H04L 12/28* (2006.01)
(52) U.S. Cl. .................................. 370/395.3; 370/476
(58) Field of Classification Search ... 370/395.1–395.6, 370/476
See application file for complete search history.

(56) References Cited

U.S. PATENT DOCUMENTS

| 7,389,462 | B1* | 6/2008 | Wang et al. | 714/748 |
| 2007/0091810 | A1* | 4/2007 | Kim et al. | 370/236 |
| 2007/0177608 | A1* | 8/2007 | Ding | 370/395.6 |
| 2008/0101312 | A1* | 5/2008 | Suzuki et al. | 370/342 |

FOREIGN PATENT DOCUMENTS

EP    1764942 A2    3/2007
WO    2008094120 A1    8/2008

OTHER PUBLICATIONS

PCT Search Report and Written Opinion; Jul. 15, 2009; CS34210 PCT/US2008/077340.
3GPP; "3RD Generation Partnership Project; Technical Specification Group Radio Access Network; Radio Link Control (RLC) Protocol Specification (Release 7)"; TS 25.322 V7.3.0 (Jun. 2007).
3GPP; "RLC Status Report SUFIS for PDU/PDU Segmanets ACK/NACK"; R2-073539; 3GPP TSG-RAN WG2 Athens, Greece; Aug. 20-24, 2007.
3GPP; 3RD Generation Partnership Project; Technical Specification Group Radio Access Network; Evolved Universal Terrestrial Radio Access (E-UTRA) Radio Link Control (RLC) Protocol Specification (Release 8): TS 36.322 VO.1.40 (Jun. 2007).

* cited by examiner

*Primary Examiner*—Phuc Tran
(74) *Attorney, Agent, or Firm*—Gary J. Cunningham

(57) ABSTRACT

A method for reporting missing data of a re-segmented data transmission in a wireless communication device is disclosed. The method comprises determining that a last re-segmented protocol data unit (PDU) segment of a re-segmented PDU has not been received. In response to determining that the last PDU segment has not been received, the method further comprises generating a status report, at a receiving wireless communication device. The status report comprises a beginning segment offset value identifying the byte position from an original PDU that begins the sequence of bytes that are carried in at least the re-segmented last PDU segment and an end segment unknown indicator.

6 Claims, 2 Drawing Sheets

US 7,684,407 B2

STATUS REPORT METHOD IN A WIRELESS COMMUNICATION SYSTEM

FIELD OF THE DISCLOSURE

The present disclosure relates generally to wireless communications, and more specifically to status reporting for protocol data unit.

BACKGROUND

In the 3GPP specification, the radio link control (RLC) protocol layer is responsible for the delivery of protocol data units (PDUs) over the radio interface. A protocol data unit is a unit portion of a data packet that is transmitted over the radio. An acknowledge mode may be used to ensure reliable delivery of the PDU. In this mode, the receiver sends a status report indicating the successful reception of the PDU. It is known to include a polling bit in the RLC PDU header or send a poll control PDU to trigger a status report from the receiver.

In some wireless communication protocols, it is possible for the RLC layer to re-segment a PDU if it has not been received successfully from the initial transmission. The re-segmentation is accomplished by dividing up the original PDU segment into a plurality of PDU segments and then retransmitting each PDU segment individually. The original PDU may have a variable length and each re-segmented PDU segments may be of varying lengths, i.e. different from the length of the other PDU segment. Each of the PDU segments can be either identified by a sub-sequence number or by the first byte location of the segment that corresponds to the original PDU.

Thus, when the receiver needs to indicate the successful reception or loss of a PDU segment, it is possible to do this in one of two ways: by including in each PDU segment the first and last byte locations as they correspond to the original un-segmented PDU or by identifying the PDU segment by including the first byte location and the length of the PDU segment. In order to assist the receiver with reassembling the re-segmented PDU, the last segment of the PDU typically includes a "last segment flag", LSF.

One consequence of the re-segmentation and the variable length segments, is that when the last segment of the data PDU is lost during transmission, the receiver cannot determine the last byte of the segment or the length of the segment in order to report back to the sender which data unit segment to be re-transmitted. This is particularly true since original PDU does not include the last length indicator and the overall length of the original PDU segment is not known to the receiver. Therefore, when the receiver determines that the last segment field (LSF) has not been received, the receiving device knows that the data is incomplete but cannot accurately relay to the transmitter which portions are missing. Thus it would be beneficial to identify an efficient mechanism to report the identity of the missing data of the re-segmented PDU.

The various aspects, features and advantages of the disclosure will become more fully apparent to those having ordinary skill in the art upon careful consideration of the following Detailed Description thereof with accompanying drawings described below. The drawings may have been simplified for clarity and are not necessarily drawn to scale.

DETAILED DESCRIPTION

Figure 1:
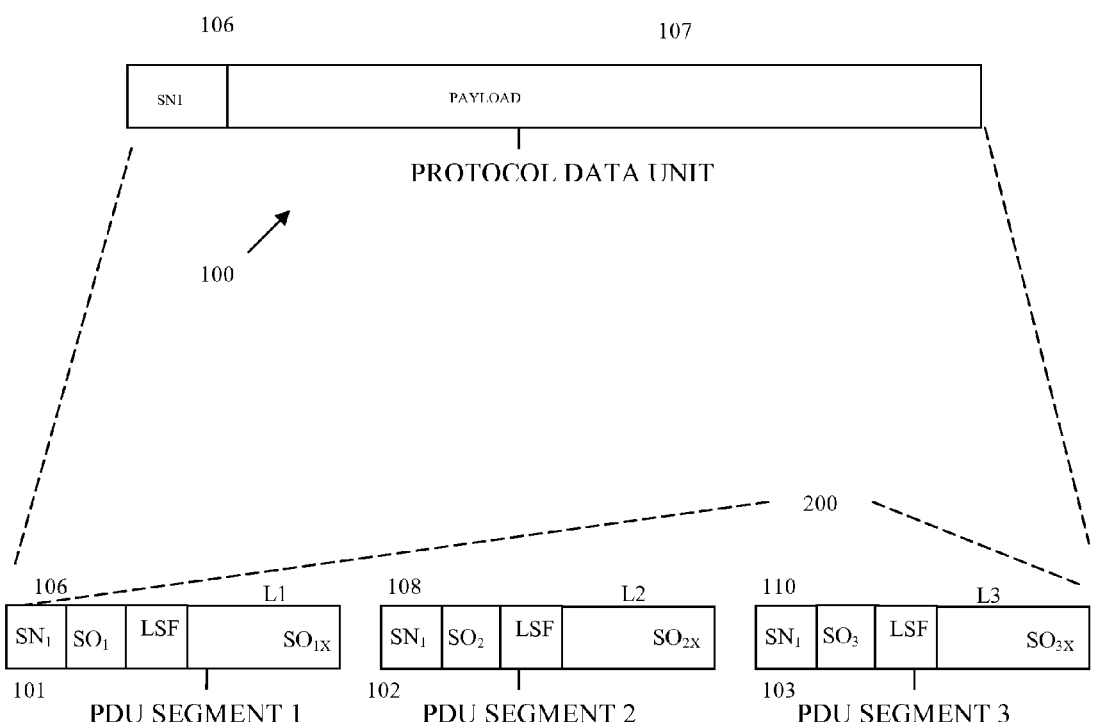
FIG. 1 is one embodiment of a re-segmented protocol data unit.

FIG. 1 illustrates one embodiment of a protocol data unit (PDU) 100 that is used in Third Generation Partnership Project (3GPP) communication systems. The PDU has been re-segmented (i.e. divided) into a plurality of PDU segments. In this embodiment, the PDU 100 has been re-segmented into three segments, a first PDU segment 101, second PDU segment 102 and third PDU segment 103. The third (i.e. last segment) PDU segment 103 includes, in this embodiment, a last segment field (LSF) 105 (a.k.a last segment flag) to indicate to the receiver, and assist the reassembly thereof, that this is the last segment of the original PDU 100. The segment that is the last segment of the re-segmented PDU, the third segment in this embodiment, has a "1" in the LSF indicating that this is the last segment. The other segments would set the LSF value to "0", indicating that they are not the last segments. Thus the other segments, the first segment 101 and the second segment 102 will have a "0" in the LSF.

The entity that sends the PDU, either a base station or the mobile station in this embodiment, and hereby referred to as the "sender" may decide to re-segment the PDU 100 for various reasons. The sender will then need to know whether all of the new re-segmented PDU segments were received properly at the receiver. In one embodiment the PDU 100 is re-segmented in response to a previously failed transmission attempt of the PDU 100. In another embodiment, the PDU 100 is re-segmented due to change in radio resource allocation strategies. One of ordinary skill in the art will understand that the reason for the re-segmentation may be insignificant.

The size of the original PDU 100 may be equal or may vary from PDU to PDU. Similarly, the size of each PDU segment of the plurality PDU segments may be equal or may vary from segment to segment. In the case where at least the PDU segments vary in length, the receiving device will not know the length of the individual segments prior to reception.

In this embodiment, the base station is a 3GPP conforming base station for telecommunication systems. The base station communicates with a wireless communication device also know as the user station, mobile equipment, remote device, user equipment (UE) mobile station (MS), mobile or the like. The base station and the MS exchange data between one another which may be traffic data such as voice communications, user data exchanges and control data associated with the traffic data and which may include the PDU and status reports related to the PDU.

In this embodiment, each PDU segment of the original PDU 100 carries only a portion of the original payload 107. The original PDU includes, in the header in this embodiment, a sequence number identifying the PDU. The payload 107 is a sequence of bits that are divided into a plurality of payloads during re-segmentation into the plurality of PDU segments.

Each segment of the re-segmented PDU includes the sequence number ($SN_1$) 106 of the original PDU 100. The sequence number is stored in a SN field of the header of each new PDU segment; in this embodiment there is a first segment SN field 106, a second segment SN field 108, and a third segment SN field 110. In each SN field of the re-segmented PDU segments, the SN value is the same value, i.e. $SN_1$, indicating that the re-segmented PDU segment is derived from to the original PDU 100.

Each PDU segment includes a segment offset (SO) field. Each byte position of the original PDU payload 107 may be referenced in the segment offset field. The value in the Segment Offset field indicates the byte position of the beginning byte that is carried in the PDU segment and divided out from the original PDU payload 107. In this embodiment the offset value is relative to the first byte of the original PDU payload, the first byte having an offset value of zero. In another embodiment the offset value is relative to the first byte of the original PDU, the first byte having an offset value of zero and the first byte of the original PDU payload 107 having a number greater than zero. Each byte of the PDU payload 107 therefore has a segment offset number, SOi associated therewith in order to identify the particular byte after the payload is divided up during re-segmentation. The segment offset field carries an offset value that corresponds to the offset of the byte position in the original PDU payload 107, indicating that the PDU segment carries the portion of the payload beginning with the byte having the segment offset value of $SO_i$.

For example, the original PDU 100 may have 0-100 bytes carried in the payload 107. The first PDU segment 101 would have a first segment offset beginning field ($SO_i$) value of "0" as this segment carries a portion of the original payload 107 beginning with the first byte "0." Similarly the second PDU segment 102 has a second offset beginning field value of "33" as this segment carries a portion of the original payload 107 beginning with the byte located at segment offset "33." The third PDU segment 103 has a third offset beginning field value of "65" as this segment carries a portion of the original payload 107 beginning with the byte located at segment offset "65."

Figure 2:
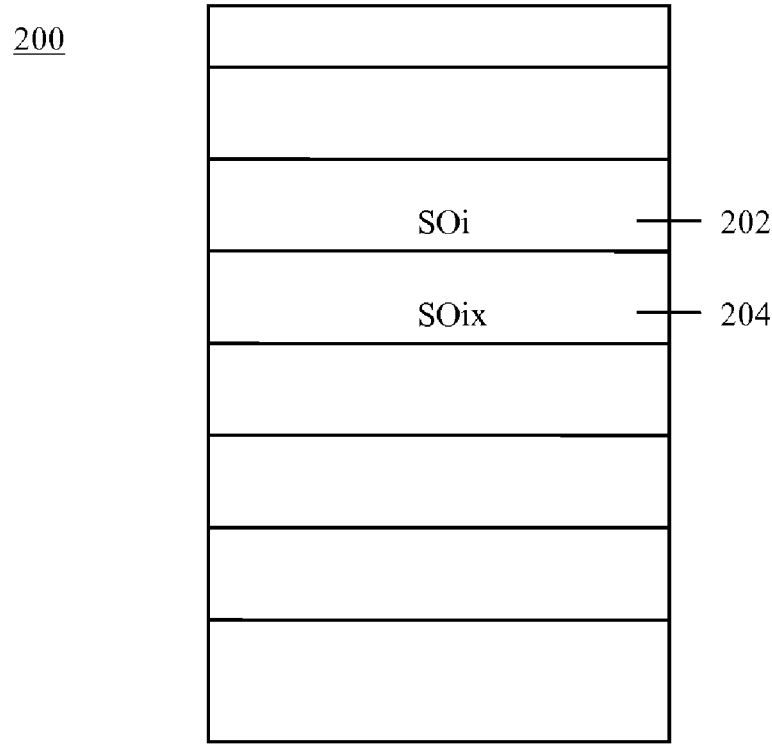
FIG. 2 is one embodiment of status report.

In order to indicate to the sender the disposition of the PDU at the receiver, the receiving device sends a status report back to the sender. One example of a PDU status report is illustrated in FIG. 2. The status report 200 may be requested by the sender of the PDU or may be automatically generated by the receiver. When data is missing at the receiver during the transmission of a re-segmented PDU, the receiver indicates to the sender that data was not received.

In this embodiment the method comprises determining that at least the last segment has not been received. In one embodiment, the receiver determines that the last segment has not been received as it has not received the segment with the LSF set to "1." Other segments besides the last segment may also be missing. The other missing data segments for example may be one of the first PDU segment 101, the second PDU segment 102 or the third PDU segment 103 or portions thereof, in this embodiment. The entire PDU segment or a portion of one or more segments may be missing or incomplete. The receiver therefore determines that the last segment of the re-segmented PDU has not been received if a segment with a LSF is not received, i.e. a segment wherein the LSF has a value of "1." Without receiving an indication that the received PDU segment is the last segment, the receiver does not know what is the ending byte of the last segment or the length of the last segment and thus the length of the original PDU that was re-segmented Upon determining the segment offset value of the last PDU segment received, the next step comprises generating a status report, at the receiving device, the report comprising a beginning sequence offset value 402. The beginning sequence offset value identifying the first byte of the missing PDU segment, the last PDU segment in this embodiment. The beginning sequence offset value 402 is determined in one embodiment, based on the last received ending segment offset value from the previous PDU segment. For example, when the previous ending segment offset value is "32," the missing PDU segment(s) beginning value is the "33." In other words the missing segment(s) beginning offset value is determined by adding one to the ending segment offset received in the last received PDU segment The status report in this example would carry a value of "33" in the second offset beginning field.

The status report further includes an end segment unknown indicator 204. In one embodiment, illustrated in FIG. 2, the end segment unknown indicator is a last byte unknown indicator 204. This indicates to the sender that the last byte of the segment is unknown; this may be represented by $SO_{ix}$. In one embodiment, this field includes a value of "0" when the last byte of the segment is unknown, i.e. $SO_{ix}=0$.

Figure 3:
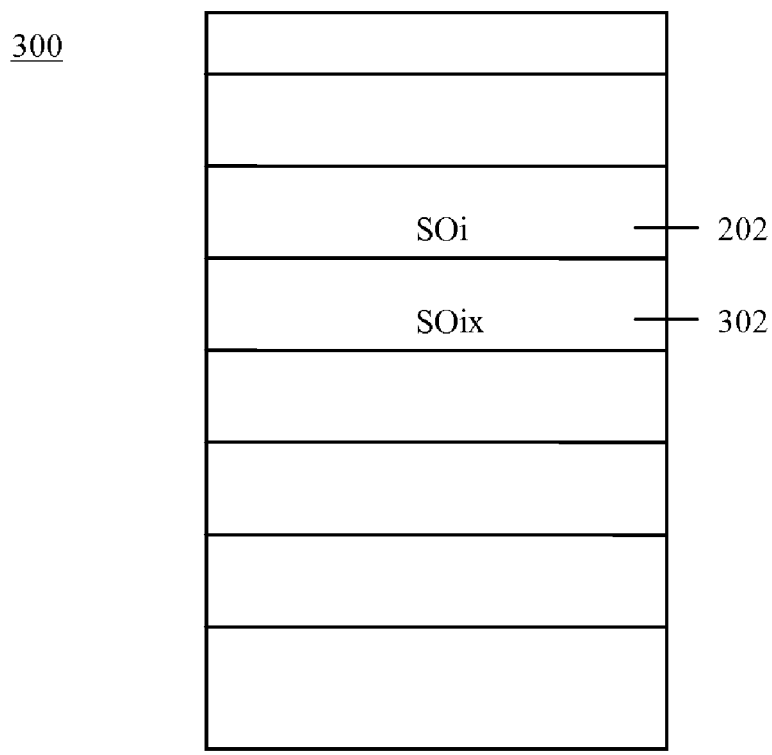
FIG. 3 is another embodiment of the status report.

In another embodiment, illustrated in FIG. 3, the end segment unknown indicator is a segment length unknown indicator 302. In this embodiment the PDU status report includes the beginning sequence offset value 402 identifying a offset beginning field as discussed in the previous embodiment and a segment length unknown indicator 302 Li, with a value of "0" indicating the length of the missing segment(s) identified is unknown.

In response to receiving the status report, the sender responds by re-sending the missing data units. In this embodiment, the method for re-transmitting a protocol data unit segment of a re-segmented PDU comprises receiving a PDU status report in response to sending a re-segmented PDU. The status report includes the beginning offset indicator and an ending offset unknown indicator, or the beginning offset indicator and a segment length unknown indicator. The sender then re-sending the PDU segment having a payload beginning with the byte indicated by the beginning offset indicator of the status report.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for reporting missing data of a re-segmented data transmission in a wireless communication device comprising:
   determining that a last re-segmented protocol data unit (PDU) segment of a re-segmented PDU has not been received;
   generating a status report, at a receiving wireless communication device, in response to determining that the last PDU segment has not been received, the status report comprising:
       a beginning segment offset value identifying the byte position from an original PDU that begins the sequence of bytes that are carried in at least the re-segmented last PDU segment; and
       an end segment unknown indicator; and
   determining that the last re-segmented PDU has not been received, based on the generated status report, by determining that a PDU segment with the end segment unknown indicator has not been received.

2. The method of claim 1, wherein the step of determining that the last re-segmented PDU has not been received, is determined by determining that a PDU segment with a last segment flag has not been received.

3. The method of claim 1 wherein the end segment unknown indicator is an ending segment offset identity unknown.

4. The method claim 1 wherein the end segment unknown indicator is a segment length unknown.

5. The method of claim 1, wherein the at least a portion of the re-segmented PDU does not include a last segment field.

6. A method for re-transmitting a protocol data unit segment of a re-segmented PDU comprising:

receiving a PDU status report in response to sending a re-segmented PDU, the status report including a beginning offset indicator and an ending offset unknown indicator;

determining that a last re-segmented PDU has not been received, based on the generated status report, by determining that a PDU segment with the ending offset unknown indicator has not been received; and re-sending the PDU segment having a payload beginning with a byte indicated by the beginning offset indicator of the received status report.

* * * * *